United States Patent
Chin et al.

(10) Patent No.: US 8,145,711 B2
(45) Date of Patent: Mar. 27, 2012

(54) MULTI-PLAYER GAME DATA VIA MULTICAST TRANSMISSION

(75) Inventors: Jae-Sun Chin, Helotes, TX (US); Michael Raftelis, San Antonio, TX (US); Gregory Henderson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 628 days.

(21) Appl. No.: 12/265,124

(22) Filed: Nov. 5, 2008

(65) Prior Publication Data

US 2010/0113157 A1 May 6, 2010

(51) Int. Cl.
*G06F 15/16* (2006.01)
(52) U.S. Cl. .............................. 709/205; 463/38; 463/42
(58) Field of Classification Search .................. 709/205; 463/38, 42

See application file for complete search history.

(56) References Cited

U.S. PATENT DOCUMENTS

| 6,226,686 | B1 | 5/2001 | Rothschild et al. | |
|---|---|---|---|---|
| 2005/0239550 | A1* | 10/2005 | Hardisty et al. | 463/42 |
| 2006/0018319 | A1 | 1/2006 | Palin et al. | |
| 2006/0072594 | A1 | 4/2006 | Swamy | |
| 2006/0221857 | A1 | 10/2006 | Bushnell et al. | |
| 2009/0011832 | A1* | 1/2009 | Rofougaran | 463/41 |
| 2010/0285875 | A1* | 11/2010 | McKenna et al. | 463/31 |

* cited by examiner

*Primary Examiner* — Mohamed Wasel
(74) *Attorney, Agent, or Firm* — Toler Law Group, PC (57) ABSTRACT

A server to host a multi-player game is disclosed. The server includes a network interface coupled to an Internet Protocol (IP) network to send and receive data related to a multi-player game. The server includes a game play data module to receive multi-player game play data from a plurality of end user gaming devices via the network interface. The multi-player game play data is received via a plurality of unicast transmissions. The server includes an assembly module to assemble the multi-player game play data received from the plurality of end user gaming devices to generate aggregated game update data. The server also includes a transmission module to transmit the aggregated game update data as a single IP multicast transmission via the network interface.

28 Claims, 7 Drawing Sheets

MULTI-PLAYER GAME DATA VIA MULTICAST TRANSMISSION

FIELD OF THE DISCLOSURE

The present disclosure is generally related to multi-player games.

BACKGROUND

A multi-player game typically requires a substantial amount of network bandwidth and server processing resources. Each player sends game updates (e.g., game play information) to a game server, and the game server sends updated information (e.g., game play information from each player) to each player via separate internet protocol (IP) unicast transmissions. Each IP unicast transmission consumes network bandwidth resources and game server processor resources. The overhead associated with a unicast connection can cause degradation in the performance of the multi-player game.

DETAILED DESCRIPTION OF THE DRAWINGS

In a particular embodiment, a server to host a multi-player game is disclosed. The server includes a network interface coupled to an Internet Protocol (IP) network to send and receive data related to a multi-player game. The server includes a game play data module to receive multi-player game play data from a plurality of end user gaming devices via the network interface. The multi-player game play data is received via a plurality of unicast transmissions. The server includes an assembly module to assemble the multi-player game play data received from the plurality of end user gaming devices to generate aggregated game update data. The server also includes a transmission module to transmit the aggregated game update data as a single IP multicast transmission via the network interface.

In another particular embodiment, a computer-readable medium is disclosed. The computer-readable medium includes operational instructions, that when executed by a processor, cause the processor to assemble multi-player game play data received from a plurality of end user gaming devices to generate aggregated game update data. The instructions further cause the processor to determine a method of transmission of the aggregated game update data based on received registration information. When the received registration information indicates that a particular device is multicast-enabled, the instructions further cause the processor to transmit the aggregated game update data as a single Internet Protocol (IP) multicast transmission to a multicast address associated with the particular device.

In another particular embodiment, a system is disclosed that includes a game controller interface to receive multi-player game play data from a first device. The system includes a network interface coupled to an Internet Protocol (IP) network to send and receive data. The system also includes a game play module adapted to transmit the multi-player game play data received from the first device to a game server via the network interface. The game play module is further adapted to receive aggregated game update data from the game server via the network interface. The aggregated game update data includes multi-player game play data from one or more devices other than the first device. The aggregated game update data is addressed to a multicast address associated with the system.

In another particular embodiment, a method is disclosed that includes receiving multi-player game play data from a first device. The method also includes transmitting the multi-player game play data received from the first device to a game server. The method further includes receiving aggregated game update data via a single multicast transmission from the game server. The aggregated game update data includes multi-player game play data from one or more other devices.

The present disclosure addresses scalability and latency issues associated with online multi-player games. In a typical online multi-player game, a game server receives game play data from each player of the multi-player game. The game server then processes the received information and sends individual game updates to each of the players via separate IP unicast transmissions. This process consumes a substantial amount of network bandwith resources as well as game server processor resources. For example, if a single unicast transmission uses ten kilobits per second (Kbps) of network bandwidth resources, then ten thousand unicast transmissions use one hundred megabits per second (i.e., ten thousand users at ten Kbps per user). For online multi-player games with thousands of players, this may strain network bandwidth and game server resources and potentially result in an unsatisfactory gaming experience. In addition, because of variable connection speeds for each player, gameplay may be inconsistent between players, creating a potential gap in either overall game play or fairness to the players.

The present disclosure uses IP multicast technology to address these shortcomings. A game server may send updates to multiple end users via a single IP multicast transmission. Further, a combination of unicast and multicast methods may be utilized to bridge networks not capable of supporting multicast. A unicast stream can effectively "tunnel" the multicast data until it gets to a multicast-enabled network. This may allow for compatibility with multiple network types and configurations. An end user gaming device may add a multicast join request to the game server. Alternatively, a multicast-enabled gateway (e.g., a residential gateway) may add the multicast join request to the game server (e.g., the residential gateway may use a configuration message or may be pre-configured for the particular game server, i.e., multicast stream). The gateway transmits the received game updates via individual unicast transmissions to each end user gaming device associated with the gateway. Alternatively, if the end user gaming device is multicast-enabled, the end user gaming device can receive game updates directly via the single IP multicast transmission from the game server. Transmission of a single multicast data stream from the game server may save network bandwidth resources and may reduce the number of servers needed to process game data from multiple players. Further, a more satisfactory user experience may result from each player receiving game updates at substantially the same time.

Figure 1:
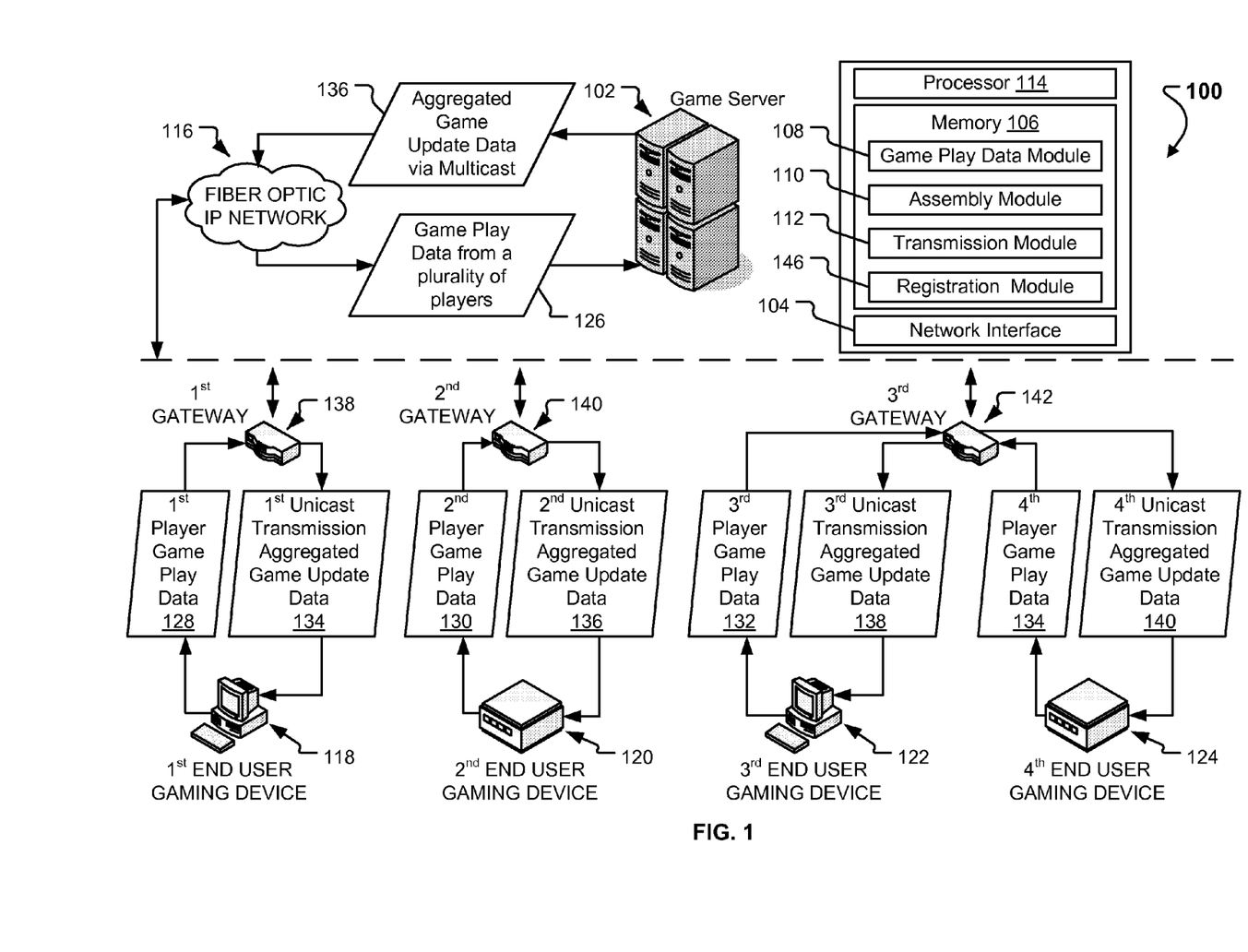
FIG. 1 is a block diagram of a first particular embodiment of a multi-player game system.

Referring to FIG. 1, a block diagram of a particular illustrative embodiment of a multi-player game system is illustrated, at 100. The multi-player game system includes a plurality of end user gaming devices and a game server 102 to host a multi-player game (e.g., a first-person shooter game, a strategy game, a virtual reality game, or any other multi-player game). The game server 102 is coupled to an internet protocol (IP) network 116 to send and receive data related to the multi-player game. In a particular embodiment, the IP network 116 includes a fiber optic network. Alternatively, the IP network 116 may include a wireless network, or any other network capable of supporting multicast transmissions from the game server 102. The plurality of end user gaming devices may include a first end user gaming device 118, a second end user gaming device 120, a third end user gaming device 122, and a fourth end user gaming device 124. In the embodiment shown in FIG. 1, the multi-player game system also includes a plurality of gateways to communicate game play data between the plurality of end user gaming devices and the game server 102. For example, the plurality of gateways may include a first gateway 138, a second gateway 140 and a third gateway 142. In alternative embodiments, the multi-player game system may include any number of end user gaming devices and any number of gateways. Further, in the case of multicast-enabled end user gaming devices, the multi-player game system may include no gateways.

The game server 102 includes a memory 106, a processor 114 and a network interface 104. The memory 106 includes a game play data module 108, an assembly module 110, and a transmission module 112. The game play data module 108 is adapted to receive game play data 126 from a plurality of players via the network interface 104. The assembly module 110 is adapted to assemble the game play data 126 from the plurality of players into aggregated game update data 136. The transmission module 112 is adapted to transmit the aggregated game update data 136 as a single IP multicast transmission via the network interface 104.

In a particular embodiment, an end user gaming device (e.g., the first end user gaming device 118) includes a personal computer (PC) gaming system, a game console system, or a set-top box, among other alternatives. Each player uses a game play control device to play the multi-player game. For example, the game play control device may include a joystick, a wired game controller, a wireless game controller, a remote control, a keyboard or a mouse, among other alternatives. As an example, if the first end user gaming device 118 is a PC gaming system, the game play control device may include a keyboard or a mouse. If the second end user gaming device 120 is a game console system, the game play control device may include a joy stick, a wired game controller, or a wireless game controller. Similarly, if the fourth end user gaming device 124 is a set-top box, the game play control device may include a remote control. Thus, many types of game play control devices may be used to play the multi-player game. Some multi-player games may only use a particular game play control device, while other multi-player games may allow use of a variety of different game play control devices.

In operation, game play data is transmitted to the game server 102 from each of the plurality of end user gaming devices. Game play data may include information, such as game moves, player movements, player actions, or any other information related to the multi-player game provided by a particular player. In a particular illustrative embodiment, the multi-player game includes a first-person shooter game. The first-person shooter game may be played by numerous players located at various locations, linked to the game server 102 by the IP network 116. The game play data from a particular player represents actions taken by that particular player. For example, a first player using the first end user gaming device 118 may move to the left. A second player using the second end user gaming device 120 may move to the right. A third player using the third end use gaming device 122 may move forward. A fourth player using the fourth end user gaming device 124 may move backward. This game play data from each of the players is communicated to the game server 102.

In the embodiment shown in FIG. 1, first player game play data 128 (e.g., the first player moving to the left) is transmitted from the first end user gaming device 118 to the first gateway 138. The first gateway 138 transmits the first player game play data 128 to the game server 102 via the IP network 116. Second player game play data 130 (e.g., the second player moving to the right) is transmitted from the second end user gaming device 120 to the second gateway 140. The second gateway 140 transmits the second player game play data 130 to the game server 102 via the IP network 116. Similarly, third player game play data 132 and fourth player game play data 134 is also communicated to the game server via the IP network 116.

One or more end user gaming devices may use a common gateway to communicate with the game server 102. For example, in the embodiment illustrated in FIG. 1, the third player game play data 132 is transmitted from the third end user gaming device 122 to the game server 102 via the third gateway 142. The fourth player game play data 134 is transmitted from the fourth end user gaming device 124 to the game server 102 via the third gateway 142. As an example, the third end user gaming device 122 and the fourth end user gaming device 124 may be located at a single location (e.g., a residence). The third gateway 142 may be associated with the single location. For example, the third end user gaming device 122 may be a PC gaming system, while the fourth end user gaming device 124 may be a game console system or a set-top box. Thus, multiple players (e.g., the third player and the fourth player) at a single location may share a common gateway (e.g., the third gateway 142) to communicate with the game server 102.

The game play data module 108 of the game server 102 receives game play data 126 from a plurality of players via the network interface 104. For example, in the embodiment illustrated in FIG. 1, the game play data 126 includes first player game play data 128, second player game play data 130, third player game play data 132, and fourth player game play data 134. In alternative embodiments, the game play data 126 received at the game server 102 includes game play data from any number of players of the multi-player game. The assembly module 110 of the game server 102 assembles the received game play data 126 into aggregated game update data 136. The aggregated game update data 136 is determined based on the game play data from each of the players (e.g., game moves or other player actions) and one or more game rules. For example, in the first-person shooter game, the game rules may relate to consequences associated with particular game play data. As an example, the game rules may determine that the first player moving left and the second player moving right places both the first player and the second player within a line of sight of each other. As another example, the first player may shoot at the second player, and the game rules may determine that because the second player is within the line of sight of the first player, the second player is wounded or killed as a result of the shot. Thus, game play data 126 received from all of the players is analyzed based on one or more game rules to generate the aggregated game update data 136.

The transmission module 112 of the game server 102 transmits the aggregated game update data 136 from the game server 102 as a single IP multicast transmission via the network interface 104. In a particular embodiment, the aggregated game update data 136 is transmitted to a multicast address associated with one or more gateways. For example, the multicast address may be associated with the first gateway 138, the second gateway 140, and the third gateway 142.

In the embodiment illustrated in FIG. 1, the plurality of gateways receive the aggregated game update data 136 via the single IP multicast transmission. A particular gateway transmits the aggregated game update data 136 as one or more unicast transmissions to each end user gaming device associated with the particular gateway. For example, the aggregated game update data 136 received at the first gateway 138 is transmitted from the first gateway 138 as a first unicast transmission 134 to the first end user gaming device 118. Similarly, the aggregated game update data 136 received at the second gateway 140 is transmitted from the second gateway 140 as a second unicast transmission 136 to the second end user gaming device 120. The aggregated game update data 136 is transmitted from the third gateway 142 as a third unicast transmission 138 to the third end user gaming device 122, and the aggregated game update data 136 is transmitted from the third gateway 142 as a fourth unicast transmission 140 to the fourth end user gaming device 124.

While a plurality of gateways are illustrated in FIG. 1, the gateways serve to translate the aggregated game update data 136 received as the single IP multicast transmission into individual unicast transmissions for delivery to end user gaming devices that are not multicast-enabled. This allows end user gaming devices that are not multicast-enabled to receive the aggregated game update data 136 from the game server 102. In alternative embodiments, multicast-enabled end user gaming devices may receive the aggregated game update data 136 directly from the game server 102 without an intervening gateway to convert the received IP multicast transmission to a unicast transmission.

In the particular embodiment illustrated in FIG. 1, the game server 102 includes a registration module 146. The registration module 146 is adapted to receive registration information via the network interface 104 and to determine a method of transmission of the aggregated game update data 136 based on the received registration information. The received registration information indicates whether a particular device is multicast-enabled. When the received registration information indicates that a first number of devices are not multicast-enabled, the aggregated game update data 136 is transmitted to each of the first number of devices via individual unicast transmissions from the game server 102. Thus, the registration information allows the game server 102 to determine which end user gaming devices receive individual unicast transmissions. Each unicast transmission from the game server 102 increases network bandwidth utilization as well as utilization of the processor 114 of the game server 102 in assembling the individual unicast transmissions. However, the registration module 146 allows players without the ability to receive the single IP multicast transmission (e.g., players not connected to the fiber optic network 116) to participate in the multi-player game.

Figure 2:
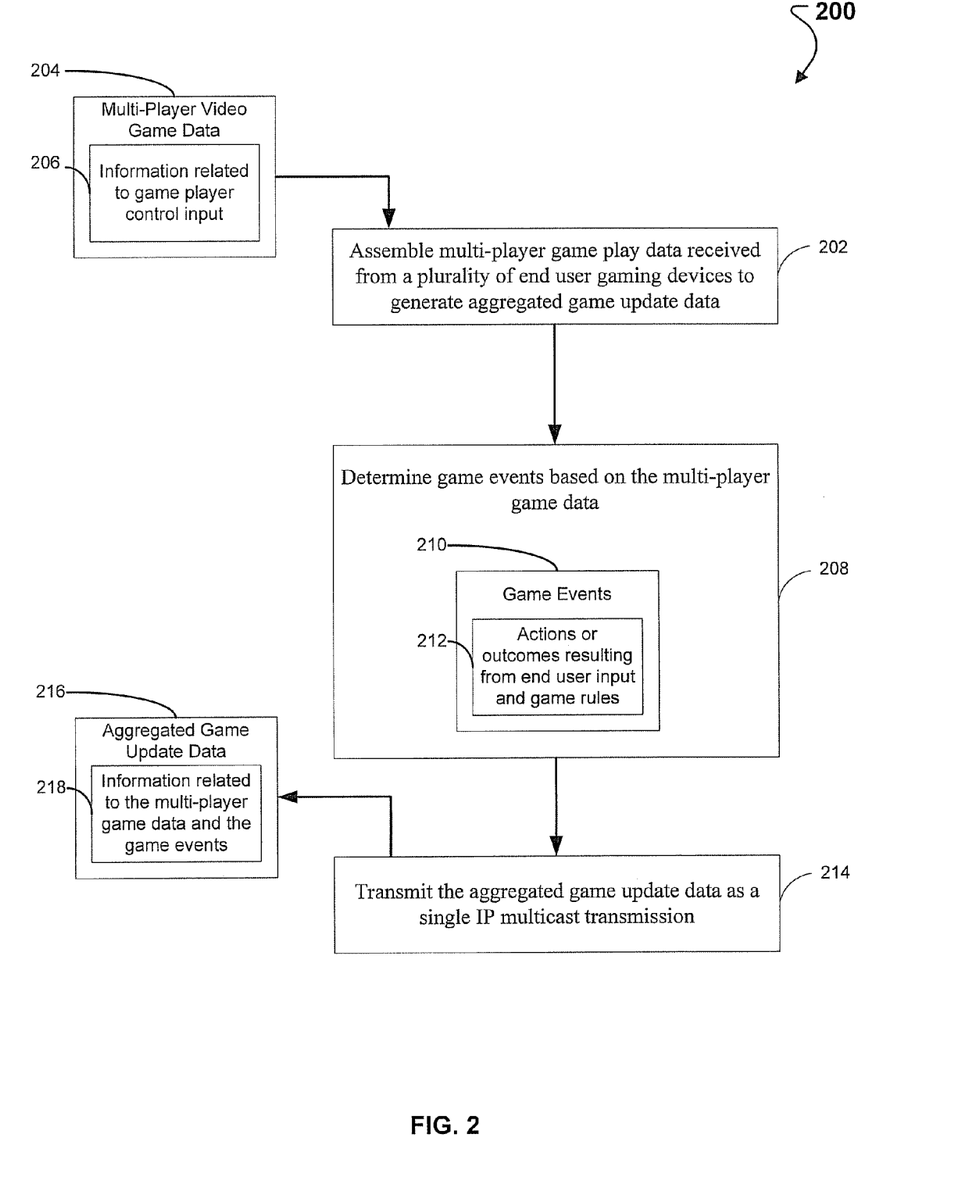
FIG. 2 is a flow chart of a first particular embodiment of a method of aggregating and transmitting multi-player game data via a single multicast transmission.

Referring to FIG. 2, a method of assembling multi-player game play data and transmitting aggregated game update data as a single IP multicast transmission is illustrated, at 200. The method may be implemented by a computer-readable medium including operational instructions, that when executed by a processor, cause the processor to perform the actions described. For example, the method may be implemented by instructions stored at the memory 108 of the game server 102 of FIG. 1. The instructions cause the processor 114 of the game server 102 to execute the operations described.

At 202, game play data received from a plurality of end user gaming devices (e.g., from a plurality of players of a multi-player game) is assembled to generate aggregated game update data. The multi-player game play data may be received at a game play data module of a game server (e.g., the game play data module 108 of the game server 102 of FIG. 1). For example, the game play data may include multi-player video game data 204 (e.g., game play data related to a first-person shooter game). The multi-player video game data 204 may include information 206 related to game player control input. For example, each player uses a game play control device to play the multi-player game. The game player control input may be received from a game play control device such as a joystick, a wired game controller, a wireless game controller, a remote control, a keyboard or a mouse, among other alternatives. As an example, the plurality of end user gaming devices may include the first end user gaming device 118, the second end user gaming device 120, the third end user gaming device 122, and the fourth end user gaming device 124 of FIG. 1. The received game play data may be assembled at the game server (e.g., the game server 102 of FIG. 1) using an assembly module (e.g., the assembly module 110 of FIG. 1).

Proceeding to 208, one or more game events 210 are determined based on the received game play data. For example, the one or more game events 210 may include actions or outcomes 212 resulting from end user input and game rules. For example, a first player may shoot at a second player, and the game rules may determine that because the second player is within the line of sight of the first player, a particular game event 210 occurs. For example, as a result of the shot, a particular outcome 212 may result (e.g., the second player is wounded or killed). As another example, a third player may move forward. The game rules may determine that another particular game event 210 occurs. For example, as a result of the forward movement, the third player may move to a location where more ammunition is stored. Thus, a particular action 212 may be taken (e.g., the third player receives additional ammunition). Based on one or more game events 210, an assembly module (e.g., the assembly module 110 of FIG. 1) generates aggregated game update data 216 (e.g., the aggregated game update data 136 of FIG. 1).

Proceeding to 214, the aggregated game update data 216 is transmitted as a single IP multicast transmission. The aggregated game update data 216 may include information 218 related to the received game play data 204 and the game events 210. For example, a transmission module (e.g., the transmission module 112 of FIG. 1) may transmit the aggregated game update data 216 as the single IP multicast transmission. In a particular embodiment, the aggregated game update data 216 is transmitted to a multicast address associated with one or more gateways. For example, the multicast address may be associated with the first gateway 138, the second gateway 140, and the third gateway 142 of FIG. 1. Alternatively, the multicast address may also be associated with one or more multicast-enabled end user gaming devices.

Figure 3:
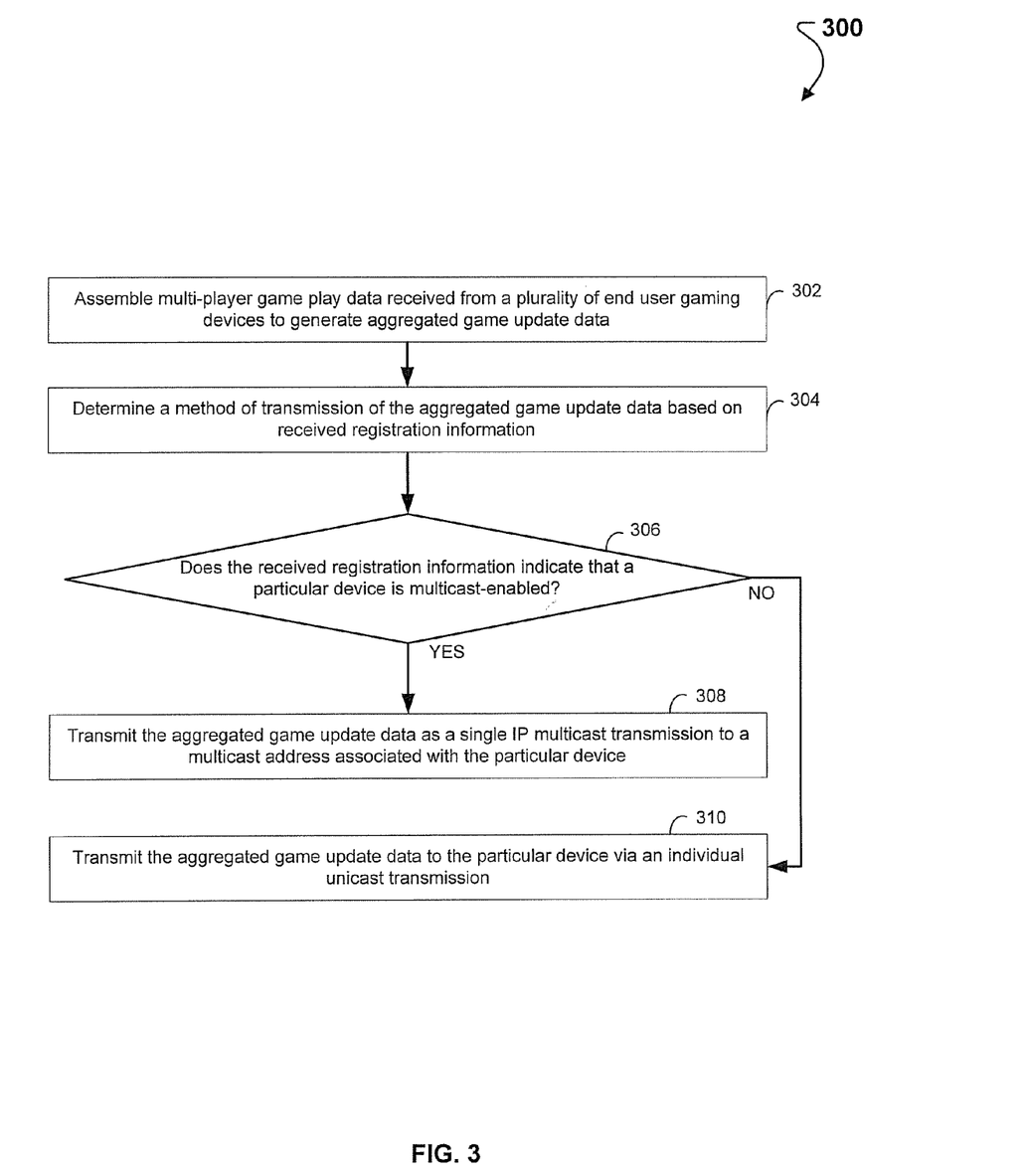
FIG. 3 is a flow chart of an embodiment of a method of transmitting aggregated game update data based on received registration information.

FIG. 3 is a flow chart of an embodiment of a method of transmitting aggregated game update data based on received registration information. The method may be implemented by a computer-readable medium including operational instructions, that when executed by a processor, cause the processor to perform the actions described. For example, the method may be implemented by instructions stored at the memory 108 of the game server 102 of FIG. 1. The instructions cause the processor 114 of the game server 102 to execute the operations described.

At 302, game play data received from a plurality of end user gaming devices (e.g., from a plurality of players of a multi-player game) is assembled to generate aggregated game update data. For example, the game play data from the plurality of players may be received at the game server 102 of FIG. 1. The plurality of end user gaming devices may include the first end user gaming device 118, the second end user gaming device 120, the third end user gaming device 122, and the fourth end user gaming device 124 of FIG. 1. The assembly module 110 of the game server 102 of FIG. 1 may be used to generate the aggregated game update data (e.g., the aggregated game update data 136).

Aggregated game update data may be transmitted to a particular end user gaming device via either a multicast transmission or an individual unicast transmission. An IP network enables multicast transmissions to end user gaming devices able to receive multicast transmissions. A method of transmission of the aggregated game update data is determined based on received registration information, at 304. For example, registration information may be received at the registration module 146 of the game server 102 of FIG. 1. At 306, it is determined whether the received registration information indicates that a particular device is multicast-enabled. When the received registration information indicates that the particular device is multicast-enabled, the method proceeds to 308, and the aggregated game update data is transmitted as a single IP multicast transmission to a multicast address associated with the particular device. When the received registration information indicates that the particular device is not multicast-enabled, the method proceeds to 310, and the aggregated game update data is transmitted to the particular device via a unicast transmission. For example, the received registration information may indicate that a first number of devices is not multicast-enabled. In this case, the aggregated game update data is transmitted to each of the first number of devices via individual unicast transmissions from the game server (e.g., the game server 102 of FIG. 1).

Thus, the registration information enables the game server to determine which end user gaming devices receive individual unicast transmissions. Each unicast transmission from the game server increases network bandwidth utilization as well as processor utilization (e.g., the processor 114 of the game server 102) in assembling the individual unicast transmissions. For example, consider a case where there are one hundred thousand total players of the multi-player game. In this case, if ninety thousand players receive aggregated game update data via individual unicast transmissions from the game server at ten Kbps per transmission, this results in network bandwidth utilization of nine hundred megabits per second (900 Mbps). Alternatively, if only ten thousand players receive aggregated game update data via individual unicast transmissions from the game server, this results in network bandwidth utilization of one hundred megabits per second (100 Mbps). If the other ninety thousand players receive aggregated game update data via the single IP multicast transmission, only ten Kbps of network bandwidth is consumed for these players. Therefore, more players receiving aggregated game update data via the single IP multicast transmission results in reduced network bandwidth utilization. However, individual unicast transmissions allow players unable to receive multicast transmissions (e.g., players without access to the fiber optic network 116 of FIG. 1) to participate in the multi-player game. Thus, while additional network bandwidth is consumed for these players, the ability to provide aggregated game update data via unicast transmissions to these players enables the multi-player game to be available to more players.

Figure 4:
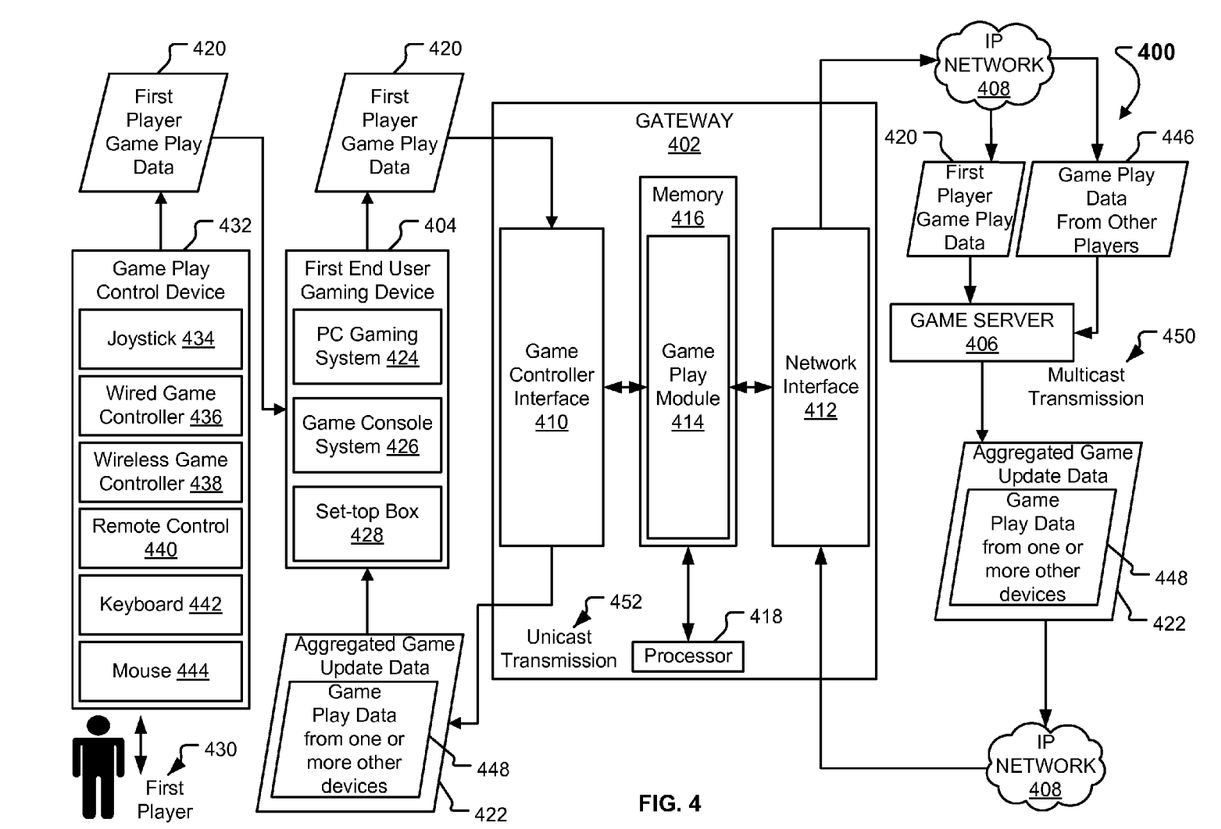
FIG. 4 is a block diagram of a second particular embodiment of a multi-player game system.

Referring to FIG. 4, a block diagram of a second particular illustrative embodiment of a multi-player game system is illustrated, at 400. The multi-player game system 400 includes a gateway 402 in communication with a first end user gaming device 404. In alternative embodiments, the gateway 402 may be in communication with additional end user gaming devices (not shown). The gateway 402 is in communication with a game server 406 via an IP network 408. In a particular embodiment, the game server 406 is the game server 102 of FIG. 1.

The gateway 402 includes a game controller interface 410, a network interface 412, a game play module 414, a memory 416, and a processor 418. The game controller interface 410 is adapted to receive first player game play data 420 from the first end user gaming device 404. The network interface 412 is coupled to the IP network 408 to communicate with the game server 406. The game play module 414 is adapted to transmit the first player game play data 420 to the game server 406 via the network interface 412. The game play module 414 is adapted to receive aggregated game update data 422 from the game server 406 via the network interface 412. The game play module 414 is further adapted to transmit the aggregated game update data 422 to the first end user gaming device 404 via the game controller interface 410.

In operation, the first end user gaming device 404 transmits the first player game play data 420 to the game controller interface 410 of the gateway 402. For example, the first end user gaming device 404 may include a personal computer (PC) gaming system 424, a game console system 426, or a set-top box 428, among other alternatives. A first player 430 uses a game play control device 432 to play the multi-player game. For example, the game play control device 432 may include a joystick 434, a wired game controller 436, a wireless game controller 438, a remote control 440, a keyboard 442, or a mouse 444, among other alternatives. As an example, if the first end user gaming device 404 is the PC gaming system 424, the game play control device 432 may include the keyboard 442 or the mouse 444. As another example, if the first end user gaming device 404 is the game console system 426, the game play control device 432 may include the joystick 434, the wired game controller 436, or the wireless game controller 438. As a further example, if the first end user gaming device 404 is the set-top box 428, the game play control device 432 may include the remote control 440. Thus, many types of game play control devices may be used to play the multi-player game. Some multi-player games may only use a particular game play control device, while other multi-player games may allow use of a variety of different game play control devices.

The first player game play data 420 may include information, such as game moves, player movements, player actions, or any other information related to the multi-player game provided by a particular player (e.g., the first player 430). In a particular illustrative embodiment, the multi-player game includes a first-person shooter game. In alternative embodiments, the multi-player game may include a racing game, a strategy game, a virtual reality game, or any other multi-player game. In the case of the first-person shooter game, the game may be played by numerous players located at various locations, linked to the game server 406 by the IP network 408. Game play data from a particular player represents actions taken by that particular player. For example, the first player 430 using the first end user gaming device 404 may move to the left. A second player (not shown) using a second end user gaming device (e.g., the second end user gaming device 120 of FIG. 1) may move to the right. A third player (not shown) using a third end use gaming device (e.g., the third end user gaming device 122 of FIG. 1) may move forward. A fourth player (not shown) using a fourth end user gaming device (e.g., the fourth end user gaming device 124 of FIG. 1) may move backward.

The game play module 414 of the gateway 402 is adapted to transmit the first player game play data 420 to the game server 406 via the network interface 412. The game server 406 receives the first player game play data 420 from the first player 430 (e.g., a move to the left) along with game play data 446 from players other than the first player 430. For example, the game server 406 may receive game play data from the second player (e.g., a move to the right), from the third player (e.g., a move forward), and from the fourth player (e.g., a move backward). The game server 406 assembles the received game play data (e.g, the first player game play data 420 and game play data from other players 446) into the aggregated game update data 422. The aggregated game update data 422 is determined based on the game play data from each of the players (e.g., game moves or other player actions) and one or more game rules. For example, in the first-person shooter game, the game rules may relate to consequences associated with particular game play data. As an example, the game rules may determine that the first player 430 moving left and the second player moving right places both the first player 430 and the second player within a line of sight of each other. As another example, the first player 430 may shoot at the second player, and the game rules may determine that because the second player is within the line of sight of the first player 430, the second player is wounded or killed as a result of the shot. Thus, game play data received from all of the players is analyzed at the game server 406 based on game rules to generate the aggregated game update data 422. The aggregated game update data 422 includes game play data 448 from one or more devices other than the first end user gaming device 404 (e.g., from the second end user gaming device, the third end user gaming device, and the fourth end user gaming device).

The game server 406 transmits the aggregated game update data 422 as a single IP multicast transmission 450 to a multicast address. The gateway 402 receives the aggregated game update data 422 at the multicast address. In a particular embodiment, the gateway 402 associates itself with the multicast address by registering with the game server 406. A plurality of other gateways or multicast-enabled end user gaming devices may also be associated with the multicast address.

The aggregated game update data 422 is received from the game server 406 via the network interface 412 of the gateway 402. The game play module 414 transmits the aggregated game update data 422 to the first end user gaming device 404 as a unicast transmission 452 via the game controller interface 410. The aggregated game update data 422 includes the game play data 448 from the one or more devices other than the first end user gaming device 404 (e.g., from the second end user gaming device, the third end user gaming device, and the fourth end user gaming device). Thus, the gateway 402 translates the aggregated game update data 422 received as the single multicast transmission 450 into the unicast transmission 452 to the first end user gaming device 404. This allows an end user gaming device that is not multicast-enabled (e.g., the first end user gaming device 404) to receive the aggregated game update data 422 from the game server 406. In alternative embodiments, multicast-enabled end user gaming devices may receive the aggregated game update data 422 directly from the game server 406 without an intervening gateway (e.g., the gateway 402) to convert the received multicast transmission 450 to the unicast transmission 452.

Figure 5:
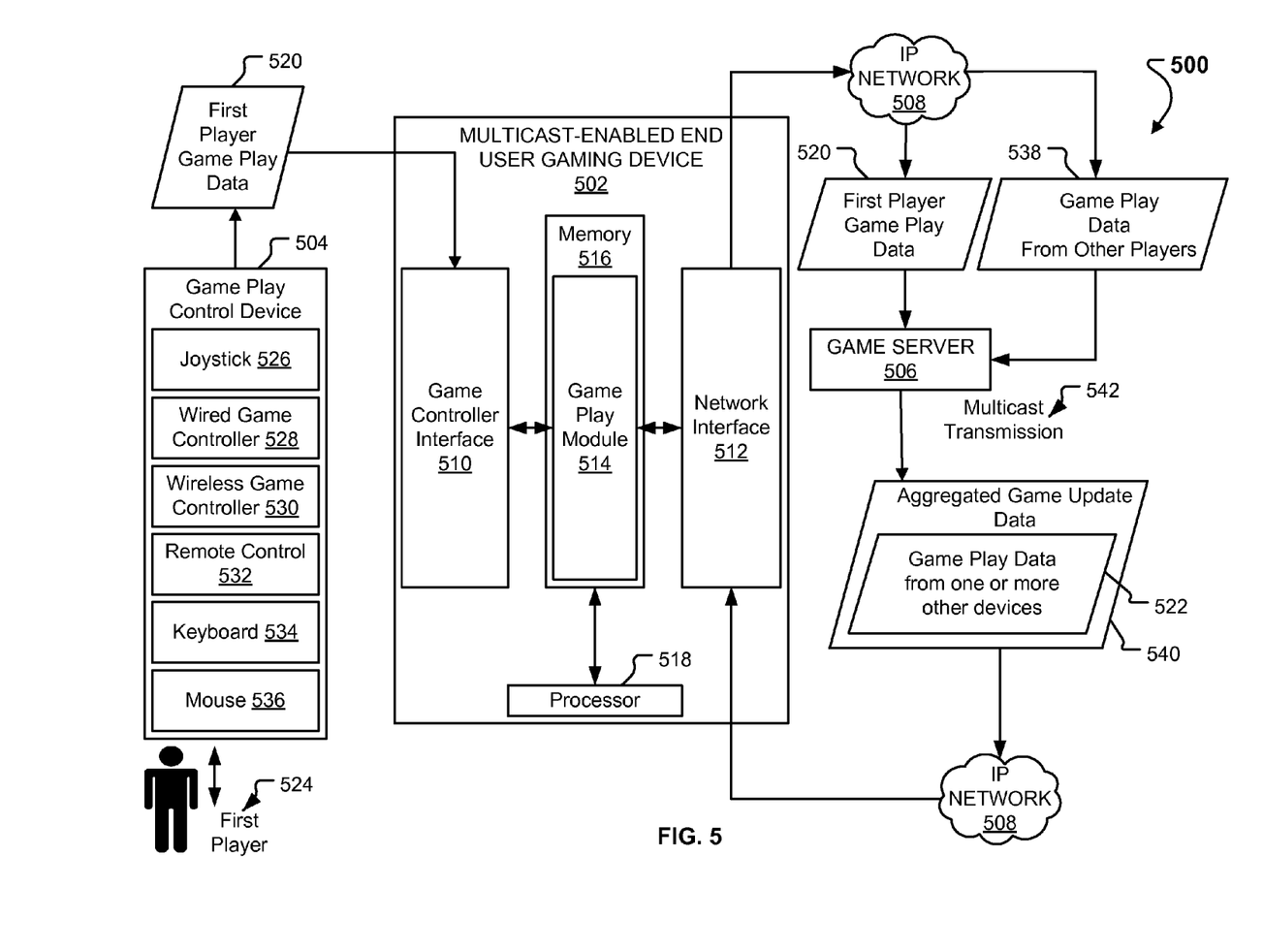
FIG. 5 is a block diagram of a third particular embodiment of a multi-player game system.

Referring to FIG. 5, a block diagram of a particular illustrative embodiment of a multi-player game system that includes a multicast-enabled end user gaming device is illustrated, at 500. The multi-player game system includes a multicast-enabled end user gaming device 502 in communication with a game play control device 504. The multicast-enabled end user gaming device 502 is further in communication with a game server 506 via an IP network 508. In a particular embodiment, the game server 506 is the game server 102 of FIG. 1.

The multicast-enabled end user gaming device 502 includes a game controller interface 510, a network interface 512, a game play module 514, a memory 516, and a processor 518. The game controller interface 510 is adapted to receive first player game play data 520 from the game play control device 504. The network interface 512 is coupled to the IP network 508 to communicate with the game server 506. The game play module 514 is adapted to transmit the first player game play data 520 to the game server 506 via the network interface 512. The game play module 514 is adapted to receive aggregated game update data 522 from the game server 506 via the network interface 512.

In operation, the game play control device 504 transmits the first player game play data 520 to the game controller interface 510 of the multicast-enabled end user gaming device 502. For example, the multicast-enabled end user gaming device 502 may include a PC gaming system, a game console system, or a set-top box, among other alternatives. A first player 524 uses the game play control device 504 to play the multi-player game. For example, the game play control device 504 may include a joystick 526, a wired game controller 528, a wireless game controller 530, a remote control 532, a keyboard 534, or a mouse 536, among other alternatives. As an example, if the multicast-enabled end user gaming device 502 is a PC gaming system, the game play control device 504 may include the keyboard 534 or the mouse 536. As another example, if the multicast-enabled end user gaming device 502 is a game console system, the game player control device 504 may include the joystick 526, the wired game controller 528, or the wireless game controller 530. As a further example, if the multicast-enabled end user gaming device 502 is a set-top box, the game play control device 504 may include the remote control 532. Thus, many types of game play control devices may be used to play the multi-player game. Some multi-player games may only use a particular game play control device, while other multi-player games may allow a variety of game play control devices.

The game play module 514 is adapted to transmit the first player game play data 520 to the game server 506 via the network interface 512. The game server 506 receives the first player game play data 520 from the first player 524 along with game play data 538 from players other than the first player 524. For example, the game server 506 may receive game play data from a second player, from a third player, and from a fourth player. The game server 506 assembles the received game play data (e.g, the first player game play data 520 and game play data from other players 538) into the aggregated game update data 522. The aggregated game update data 522 is determined based on the game play data from each of the players (e.g., game moves or other player actions) and one or more game rules. The aggregated game update data 522 includes game play data 540 from one or more devices other than the multicast-enabled end user gaming device 502 (e.g., from the second end user gaming device, the third end user gaming device, and the fourth end user gaming device).

The game server 506 transmits the aggregated game update data 522 as a single IP multicast transmission 542 to a multicast address. The aggregated game update data 522 is received from the game server 506 via the network interface 512 of the multicast-enabled end user gaming device 502. The multicast-enabled end user gaming device 502 is associated with the multicast address. In a particular embodiment, the multicast-enabled end user gaming device 502 associates itself with the multicast address by registering with the game server 506. A plurality of other multicast-enabled end user gaming devices or gateways may also be associated with the multicast address.

Figure 6:
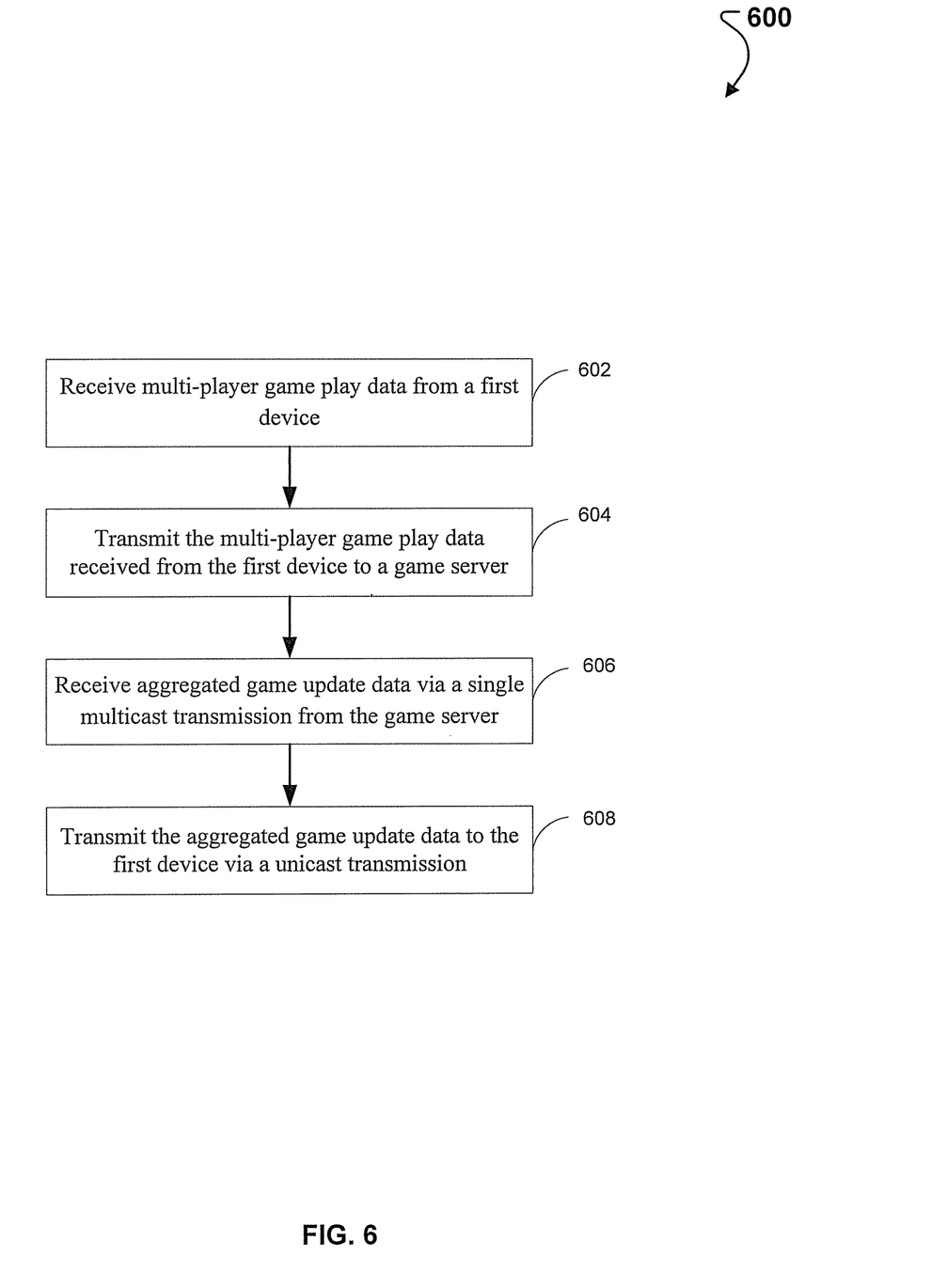
FIG. 6 is a flow chart of a first particular embodiment of a method of receiving multi-player game data via a single multicast transmission.

Referring to FIG. 6, a method of receiving multi-player game data is illustrated, at 600. The method may be implemented by a computer-readable medium including operational instructions, that when executed by a processor, cause the processor to perform the actions described. For example, the method may be implemented by instructions stored at the memory 416 of the gateway 402 of FIG. 4. The instructions cause the processor 418 of the gateway 402 to execute the operations described.

The method 600 includes receiving multi-player game play data from a first device, at 602. The first device may include an end user gaming device, such as a PC gaming system, a game console system, or a set-top box (as illustrated in FIG. 4). In a particular embodiment, the multi-player game play data is received via a unicast transmission from the first device. For example, the end user gaming device (e.g., the first end user gaming device 404 of FIG. 4) may not be multicast-enabled and may transmit the game play data via the unicast transmission to a multicast-enabled gateway (e.g., the gateway 402 of FIG. 4). The game play data is transmitted to a game server (e.g., the game server 406 of FIG. 4), at 604.

The method also includes receiving aggregated game update data via a single IP multicast transmission from the game server, at 606. For example, the aggregated game update data 422 is received from the game server 406 via the single IP multicast transmission 450, as in FIG. 4. The aggregated game update data includes game play data from one or more other devices. The one or more other devices are different from the first device. Thus, the aggregated game update data received from the game server includes game play data from a plurality of players of the multi-player game. The aggregated game update data includes information related to the multi-player game data and game events. For example, the game events may include movements of players or other game events.

The aggregated game update data received from the game server is transmitted to the first device via a unicast transmission, at 608. For example, the aggregated game update data 422 is transmitted from the gateway 402 to the first end user gaming device 404, as in FIG. 4. Thus, the first device receives game updates related to game events associated with player actions of the other multi-player game participants.

Figure 7:
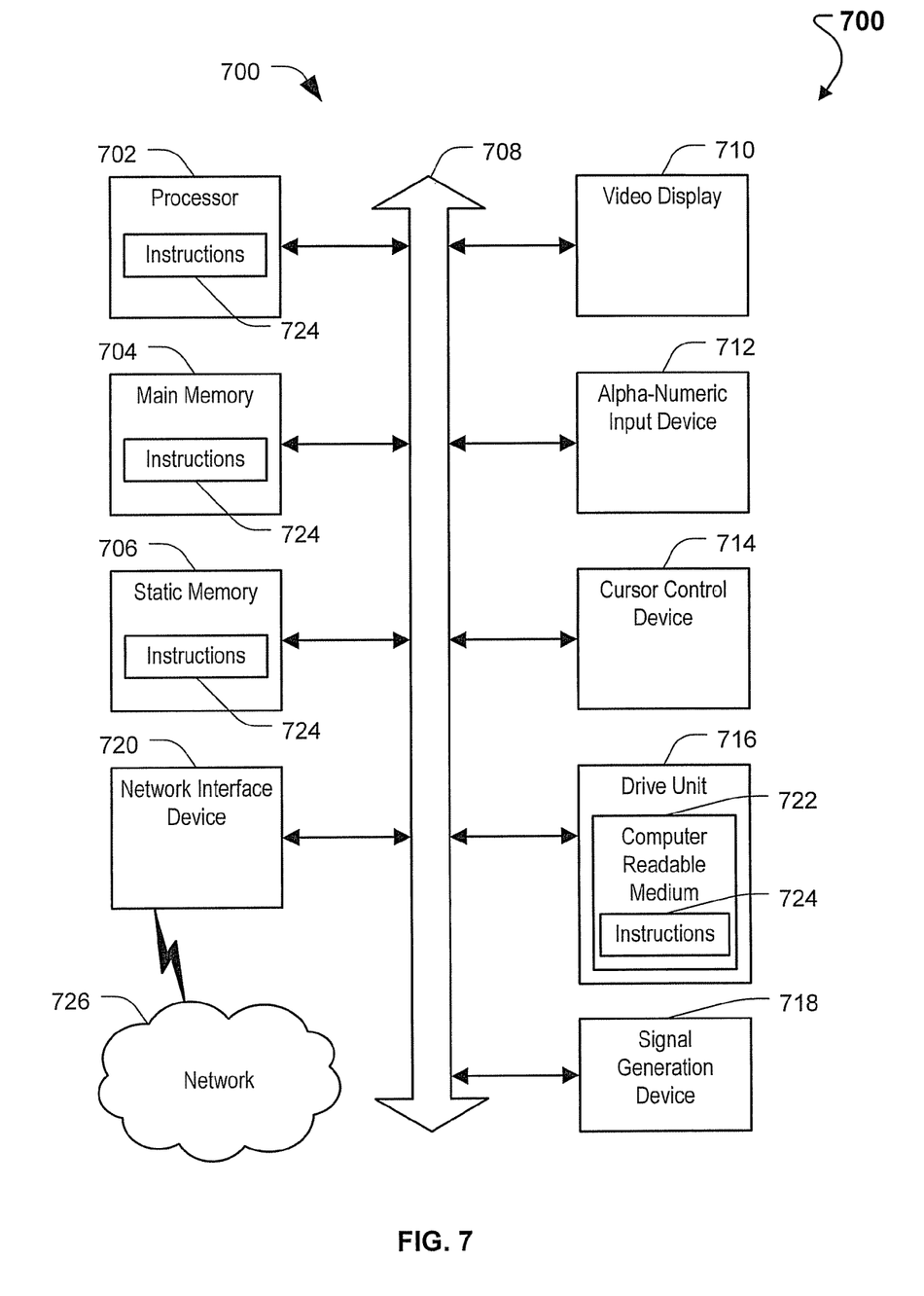
FIG. 7 is an illustration of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the general computer system 700 may include or be included within any one or more of the devices, servers, repositories, and network elements illustrated in FIG. 1, FIG. 4 and FIG. 5.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a game console, a tablet PC, a set-top box (STB), a personal digital assistant (PDA), a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, a projection display, a high definition television (HDTV) display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting exemplary embodiment, the computer-readable medium can include a solid-state memory, such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered equivalent to a tangible storage medium. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for IP multicast transmissions and IP unicast transmissions represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A server to host a multi-player game, the server comprising:
a network interface coupled to an Internet Protocol network, the network interface to send and receive data related to a multi-player game;
a game play data module to receive multi-player game play data from a plurality of end user gaming devices via the network interface, wherein the multi-player game play data is received via a plurality of unicast transmissions;
an assembly module to assemble the multi-player game play data received from the plurality of end user gaming devices to generate aggregated game update data; and
a transmission module to transmit the aggregated game update data to each end user gaming device of a subset of the plurality of end user gaming devices in an internet protocol multicast transmission via the network interface, wherein each end user gaming device of the subset is multi-cast enabled, and to transmit the aggregated game update data to a particular end user gaming device of the plurality of end user gaming devices in an outgoing unicast transmission in response to an indication that the particular end user gaming device is not multicast-enabled.

2. The server of claim 1, wherein the aggregated game update data is transmitted to a multicast address associated with one or more gateways.

3. The server of claim 1, wherein the aggregated game update data is transmitted to a multicast address associated with one or more end user gaming devices.

4. The server of claim 3, wherein the one or more end user gaming devices include one or more of a personal computer gaming system, a game console system, and a set-top box.

5. The server of claim 1, further comprising:
a registration module to receive registration information associated with each end user gaming device via the network interface and to determine, for each end user gaming device based on the corresponding received registration information, whether the end user gaming device is multicast-enabled.

6. The server of claim 5, wherein the aggregated game update data is transmitted to a first plurality of devices via corresponding unicast transmissions in response to the received registration information indicating that each of the first plurality of devices is not multicast-enabled.

7. The server of claim 1, wherein the Internet Protocol network includes a fiber optic network.

8. A non-transitory computer-readable medium comprising operational instructions that when executed by a processor, cause the processor to:
assemble multi-player game play data received from a plurality of end user gaming devices to generate aggregated game update data;
determine a method of transmission of the aggregated game update data based on received registration information; and
in response to the received registration information indicating that a particular device is multicast-enabled, transmit the aggregated game update data as an Internet Protocol multicast transmission to a multicast address associated with the particular device.

9. The non-transitory computer-readable medium of claim 8, further comprising operational instructions that when executed by the processor, cause the processor to transmit the aggregated game update data to a subset of the plurality of end user gaming devices via corresponding unicast transmissions to each end user gaming device of the subset of the plurality of end user gaming devices in response to the received registration information indicating that each end user gaming device of the subset of the plurality of end user gaming devices is not multicast-enabled.

10. The non-transitory computer-readable medium of claim 8, wherein the aggregated game update data includes information associated with the multi-player game play data and one or more game events.

11. The non-transitory computer-readable medium of claim 10, wherein the one or more game events include at least one of actions resulting from end user input, outcomes resulting from end user input, and one or more game rules.

12. The non-transitory computer-readable medium of claim 10, further comprising operational instructions that when executed by the processor, cause the processor to determine the one or more game events based on the multi-player game play data.

13. The non-transitory computer-readable medium of claim 8, wherein the multi-player game play data includes information related to game player control input.

14. The non-transitory computer-readable medium of claim 8, wherein the multi-player game play data includes multi-player video game data.

15. The non-transitory computer-readable medium of claim 8, wherein the multicast address associated with the particular device is associated with one or more gateways.

16. The non-transitory computer-readable medium of claim 8, wherein the multicast address associated with the particular device is associated with one or more end user gaming devices.

17. A system comprising:
a game controller interface to receive first multi-player game play data from a first device;
a network interface coupled to an Internet Protocol network, the network interface adapted to send and receive data; and
a game play module adapted to:
receive the first multi-player game play data from the game controller interface;
transmit the first multi-player game play data to a game server via the network interface; and
receive aggregated game update data from the game server via the network interface, wherein the aggregated game update data includes second multi-player game play data aggregated from one or more devices other than the first device;
wherein the aggregated game update data is addressed to a multicast address associated with the system in response to an indication that the system is multicast enabled and wherein the aggregated game updated data is addressed to a unicast address associated with the system in response to an indication that the system is not multicast-enabled.

18. The system of claim 17, wherein the first device includes an end user gaming device.

19. The system of claim 18, wherein the game play module transmits the aggregated game update data to the end user gaming device via the game controller interface, and wherein the aggregated game update data is transmitted from the game play module to the end user gaming device via a unicast transmission in response to an indication that the end user gaming device is not multicast-enabled.

20. The system of claim 18, wherein the end user gaming device includes one of a personal computer gaming system, a game console system, and a set-top box.

21. The system of claim 17, wherein the first device includes a game play control device.

22. The system of claim 17, wherein the one or more devices other than the first device include one or more of a personal computer gaming system, a game console system, and a set-top box.

23. A method comprising:
receiving multi-player game play data at an end user gaming device from a first device;
transmitting, by the end user gaming device, the multi-player game play data to a game server; and
receiving aggregated game update data at the end user gaming device from the game server, wherein the aggregated game update data includes multi-player game play data from one or more other devices, wherein the aggregated game update data is received via a multicast transmission in response to an indication that the end user gaming device is multicast-enabled, and wherein the aggregated game update data is received via a unicast transmission in response to an indication that the end user gaming device is not multicast-enabled.

24. The method of claim 23, further comprising transmitting the multi-player game play data to the game server via a unicast transmission.

25. The method of claim 23, wherein the first device includes a game play control device.

26. The method of claim 25, wherein the game play control device includes one of a joystick, a wired game controller, a wireless game controller, a remote control, a keyboard, and a mouse.

27. The method of claim 23, further comprising providing registration information to the game server, the registration information including the indication that the end user gaming device is multicast-enabled.

28. The method of claim 23, further comprising providing registration information to the game server, the registration information including the indication that the end user gaming device is not multicast-enabled.

* * * * *